Patented July 13, 1954

2,683,648

UNITED STATES PATENT OFFICE 2,683,648

PROCESS FOR PURIFYING ALKALI METAL CYANATES

Homer L. Robson, Lewiston, N. Y., assignor to Mathieson Chemical Corporation, a corporation of Virginia No Drawing. Application June 12, 1952,
Serial No. 293,197

3 Claims. (Cl. 23—75)

My invention relates to the purification of alkali metal cyanates and in particular relates to a method for reducing the content of cyanides and organic impurities in crude or partly refined alkali metal cyanates.

In one method for the manufacture of alkali metal cyanates, particularly those of lithium, sodium and potassium, the carbonate of the alkali metal and urea are fused together. Ammonia is liberated and the liquid cyanate is solidified. In order to obtain satisfactory yields an excess of the alkali metal carbonate is usually employed. For many purposes its presence in the product is not objectionable but it may be removed if desired, for example, by crystallization from water, to produce a partly refined cyanate. The cyanate is usually also contaminated by the alkali metal cyanide and organic impurities such as slow dissolving urea polymers, cyamelide and biuret. The cyanide content of crude cyanate produced by this process is ordinarily not over about 1 per cent but may amount of as much as 5 per cent.

One of the important uses of alkali metal cyanates is as a herbicide and the presence of cyanide in the product is objectionable for this use. When the crude cyanate is distributed on a field its cyanide content may poison domestic animals. Thus it is important to remove cyanide even though the carbonate may not be objectionable. Government authorities have recommended a cyanide content of about 0.02 per cent as a maximum when cyanates are used as herbicides. The organic impurities in the cyanate are objectionable in that they render the product less soluble in water and may deleteriously affect stability in storage. Moreover, they discolor the product so that it does not have a desirable appearance.

I have found that contacting fused crude or partly refined alkali metal cyanates with an alkali metal nitrate simultaneously removes cyanide and organic impurities to produce an almost completely cyanide and organic impurities-free alkali metal cyanate of improved color.

According to the process of my invention, I fuse a crude or partly refined alkali metal cyanate with an alkali metal nitrate in an amount at least sufficient to remove the cyanide and organic impurities, e. g. usually about 1 to 10 weight per cent. It is preferable to use the nitrate in sufficient excess to insure the effective removal of cyanide and organic impurities. In one advantageous modification of my invention, the nitrate is added as a finely divided solid to the cyanate fusion as it comes from the reaction chamber. Alternatively, fused nitrate is mixed with the fused cyanate. It is preferable to add the nitrate to the cyanate fusion as formed as losses of cyanate are encountered if the product is solidified and remelted in order to effect the treatment with nitrate. The contacting time is preferably short, e. g. about 20 to 40 seconds, as losses of cyanate may result if the mixture is held in the fused condition for excessive periods. The impurities are quickly oxidized and the fusion is preferably quickly solidified, for example, by flaking. The solid product is almost completely free of cyanide, e. g. as low as 0.02 per cent cyanide, and organic impurities. Moreover, the product is a white product of desirable appearance.

Preferably the alkali metal in the nitrate corresponds to that in the cyanate, for example, sodium nitrate is preferred for the treatment of sodium cyanate. The alkali metal nitrate oxidizes the cyanide contained in the composition probably according to the following equation in which M is an alkali metal:

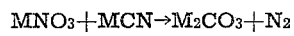
$$MNO_3 + MCN \rightarrow M_2CO_3 + N_2$$

Cyamelide, biuret and/or any other organic impurities in the composition are oxidized to innocuous gaseous products. Stoichiometrically according to the equation given above about 1.73 parts of sodium nitrate are required per part of sodium cyanide present. However, additional nitrate is required to oxidize the organic impurities. Ordinarily these bear a fairly constant relation to the cyanide content and from about 2.5 to 3.5 parts by weight of nitrate per part of cyanide is preferred. Thus, the necessary amount of nitrate required to treat the mixture can be readily determined by determining the cyanide content of the mixture by analysis. With good operation in the formation of the cyanate, the cyanide content will usually not exceed about 1 per cent and the nitrate addition in this case should amout to about 2.5 to 3.5 per cent. Depending on the cyanide content and organic impurities, the necessary amount of nitrate will usually vary from about 1 to 10 per cent.

With very poor cyanate containing 2 per cent or more of cyanide it is preferable to add the nitrate in small portions or in two or more stages in order to accommodate the foaming due to evolution of gas. Losses of cyanate may result if it is held in the fused condition for excessive periods and this is to be avoided. A period of about 20 to 40 seconds is ample to complete the purification reaction and the fusion is preferably quickly solidified, for example, by flaking. The carbonate content of the cyanate may be removed, if desired, in a separate step before or after the treatment with nitrate.

The process of my invention will be further illustrated by the following examples:

*Example I*

A material containing 90.4 per cent of sodium cyanate and 0.92 per cent of sodium cyanide, somewhat discolored due to organic matter, was mixed with 2 per cent by weight of sodium nitrate. The mixture was fused and poured onto a porcelain surface. The cooled material contained 87.4 per cent of sodium cyanate and only 0.19 per cent of sodium cyanide.

*Example II*

Another sample of the same crude cyanate was similarly treated with 3 per cent of sodium nitrate. The product contained 87.1 per cent of sodium cyanate and only 0.023 per cent of sodium cyanide.

*Example III*

A stream of the same crude cyanate was fed to a heated stainless steel plate where it melted and ran into the trough of a flaking roll. About 3 per cent sodium nitrate was added directly to the trough and the product was flaked. It was white and contained only 0.03 per cent sodium cyanide.

I claim:

1. A method for purification of alkali metal cyanates by removal of cyanide and organic impurities, which comprises contacting a fused alkali metal cyanate with an alkali metal nitrate in an amount at least sufficient to remove cyanide and organic impurities and recovering a substantially cyanide and organic impurities-free alkali metal cyanate.

2. The method of claim 1 in which the alkali metal cyanate is sodium cyanate and the alkali metal nitrate is sodium nitrate.

3. The method of claim 1 in which the alkali metal nitrate is used in an amount of about 1 to 10 weight per cent of the alkali metal cyanate weight.

References Cited in the file of this patent

UNITED STATES PATENTS

| Number | Name | Date |
|---|---|---|
| 2,334,723 | Neumark | Nov. 23, 1943 |